Dec. 23, 1958  E. V. MARSHALL  2,865,580
OIL COOLING AND DRAG REDUCING SYSTEM
Filed June 25, 1956  2 Sheets-Sheet 1
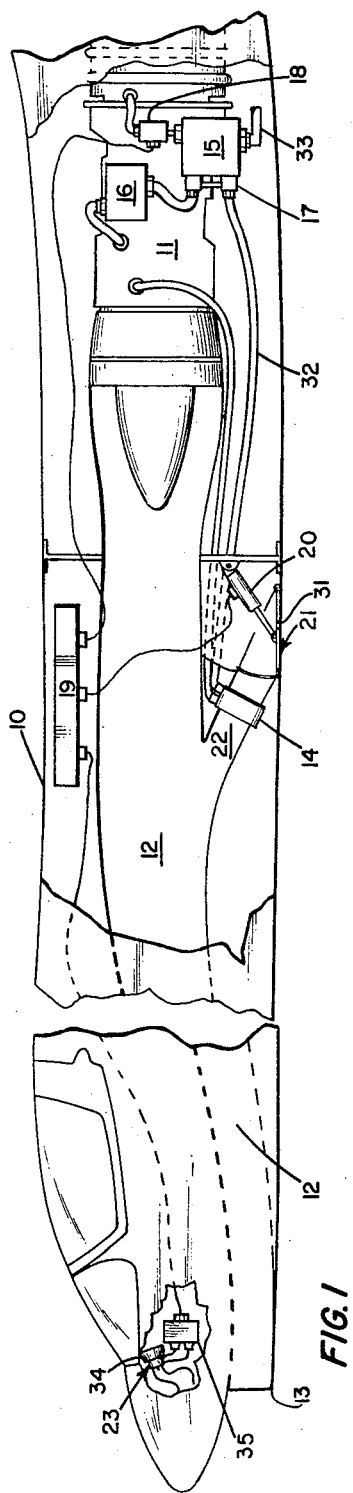
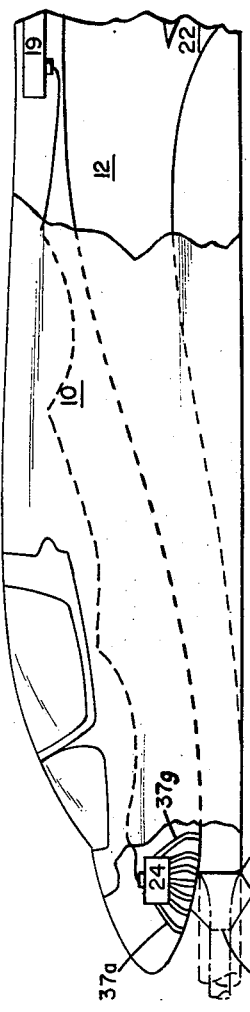
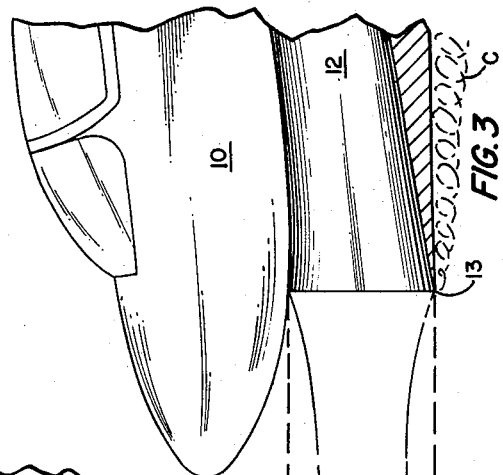
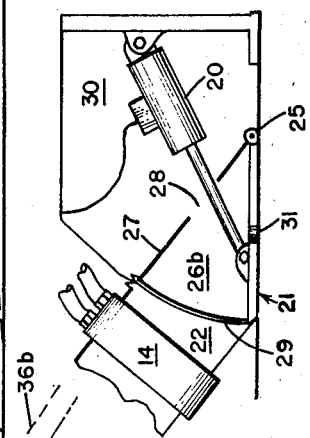
INVENTOR.
EDMUND V. MARSHALL
BY
W. R. Robertson
AGENT

United States Patent Office 2,865,580
Patented Dec. 23, 1958

2,865,580

OIL COOLING AND DRAG REDUCING SYSTEM

Edmund V. Marshall, Dallas, Tex., assignor to Chance Vought Aircraft, Incorporated, Dallas, Tex., a corporation of Delaware Application June 25, 1956, Serial No. 593,654

14 Claims. (Cl. 244—57)

The present invention relates to a new combination oil cooling and drag reducing system for high speed vehicles, such as aircraft, sleds, or boats.

Herebefore major difficulties have been encountered in the designing of an oil cooling system readily adaptable to existing systems of air consuming supersonic vehicles, particularly aircraft, for obtaining and maintaining the proper engine lubricating oil temperature throughout the various velocities from subsonic to supersonic without loss of reliability due to complexity of the system, without adding size, weight, and drag, and without decreasing thrust. Likewise, major difficulties have been encountered in the designing of a drag reducing system readily adaptable to existing systems of air consuming supersonic vehicles, especially aircraft, for reducing drag due to spillage of air over the air duct inlet at the various velocities without resulting in loss of reliability due to complexity of the system, without adding size, weight, and drag, and without decreasing thrust.

A primary object of this invention is to provide a combined oil temperature controlling and drag reducing system which serves efficaciously to cool and regulate the temperature of the aircraft engine lubricating oil for various velocities of the aircraft as well as to provide an oil temperature controlling system which increases the net thrust of the aircraft by decrease of air spillage drag.

Another object of the invention is to provide an oil temperature controlling and drag reducing system that provides for the consumption of the entire quantity of air enclosed by the area projected by the air duct inlet on a plane normal to the air duct longitudinal axis.

Another object of this invention is to provide an oil temperature controlling and drag reducing system responsive to pressure sensing means in the aircraft for reducing drag on the aircraft.

A still further object of this invention is to provide an oil cooling and drag reducing system in an aircraft responsive to the position of the shock wave forward of the air duct inlet to zero the air spillage or spillage drag over and out of the air duct inlet lips.

A still further object of this invention is to provide an oil cooling and drag reducing system in an aircraft responsive to the aircraft speed for reducing drag on the aircraft.

Another object of the invention is to provide a by-pass air duct from the main air supply duct wherein the operation of a closure in the by-pass air duct is unaffected by varying pressures in either air duct.

Another object of this invention is to provide an oil temperature and drag reducing system which is readily adaptable to existing systems and provides increased cooling efficiency through use of the large potential heat sink, the aircraft fuel, resulting in a system lighter in weight, smaller in size, and causing less aerodynamic drag.

Another object of this invention is to provide a method for cooling engine oil and reducing aerodynamic drag on subsonic to supersonic vehicles.

Other objects of the invention and the various advantages and characteristics of the present oil temperature controlling and drag reducing system will be apparent from the following detailed description, together with the accompanying drawings, submitted for purposes of illustration only and not intended to define the scope of the invention, reference being had for that purpose to the subjoined claims.

In the conventional aircraft power plant installation, the engine is provided with a force feed lubricating system including a pump for circulating the engine oil from the engine through the oil cooler or for controlling the oil flow therethrough in order that the lubricating oil may be maintained at the desired temperature. Likewise, in the past, means have been provided in the oil tank to permit of a rapid warming up of a small portion of the oil in the tank after which the main body of oil in the tank may eventually be warmed as disclosed in Patent 2,021,282. The instant invention provides an improved thermostatic system for controlling oil temperature and which system further increases the net thrust of the aircraft power plant at high speeds by reduction of spillage drag due to overflow of air at the inlet of the air intake duct.

Briefly, the disclosed oil cooling and drag reducing system comprises essentially the combination of a by-pass air duct system and an oil cooling system of an air consuming, supersonic vehicle such as a jet powered aircraft, sled, or boat. This combination, which provides a superior and an exceptionally light-weight and low drag oil cooling and air removal system of less complexity and which is readily adaptable to existing systems, utilizes the engine fuel for cooling the engine oil in a fuel-oil heat exchanger as the fuel flows to the engine. The fuel is permitted to reach and maintain a desired maximum temperature, i. e., that temperature just below the vaporization and cracking temperatures which would cause breakdown into the harmful gums, carbons, and varnishes of the fuel as may occur in all oil cooling systems that vaporize the fuel, one of which being disclosed in Patent 2,675,671, for example. A second and an air-oil heat exchanger positioned in the by-pass air duct for using the by-pass air required to be dumped overboard, is utilized when the desired maximum fuel temperature has been reached and the flow of by-pass cooling air is controlled by a gate valve which is controlled by a fuel temperature sensing element. Another feature comprises an overriding control of the by-pass air duct valve responsive to a pressure sensing device for controlling the spillage drag on the inlet of the air duct. This pressure sensing device may be either the Mach meter of the aircraft standard equipment or a pressure sensing device at the air duct inlet.

For a better understanding of the invention, reference may be had to the following description taken in connection with the accompanying drawings in which:

Fig. 1 is a partial cutaway side view of an aircraft illustrating the oil cooling and drag reducing system therein;

Fig. 2 is a modification of the system of Fig. 1 disclosing a different pressure sensing device;

Fig. 3 is a partial cutaway side view of the aircraft illustrating the effect of the system on inlet airflow;

Fig. 4 is an enlarged detailed view of the by-pass air duct closure; and

Figure 5:
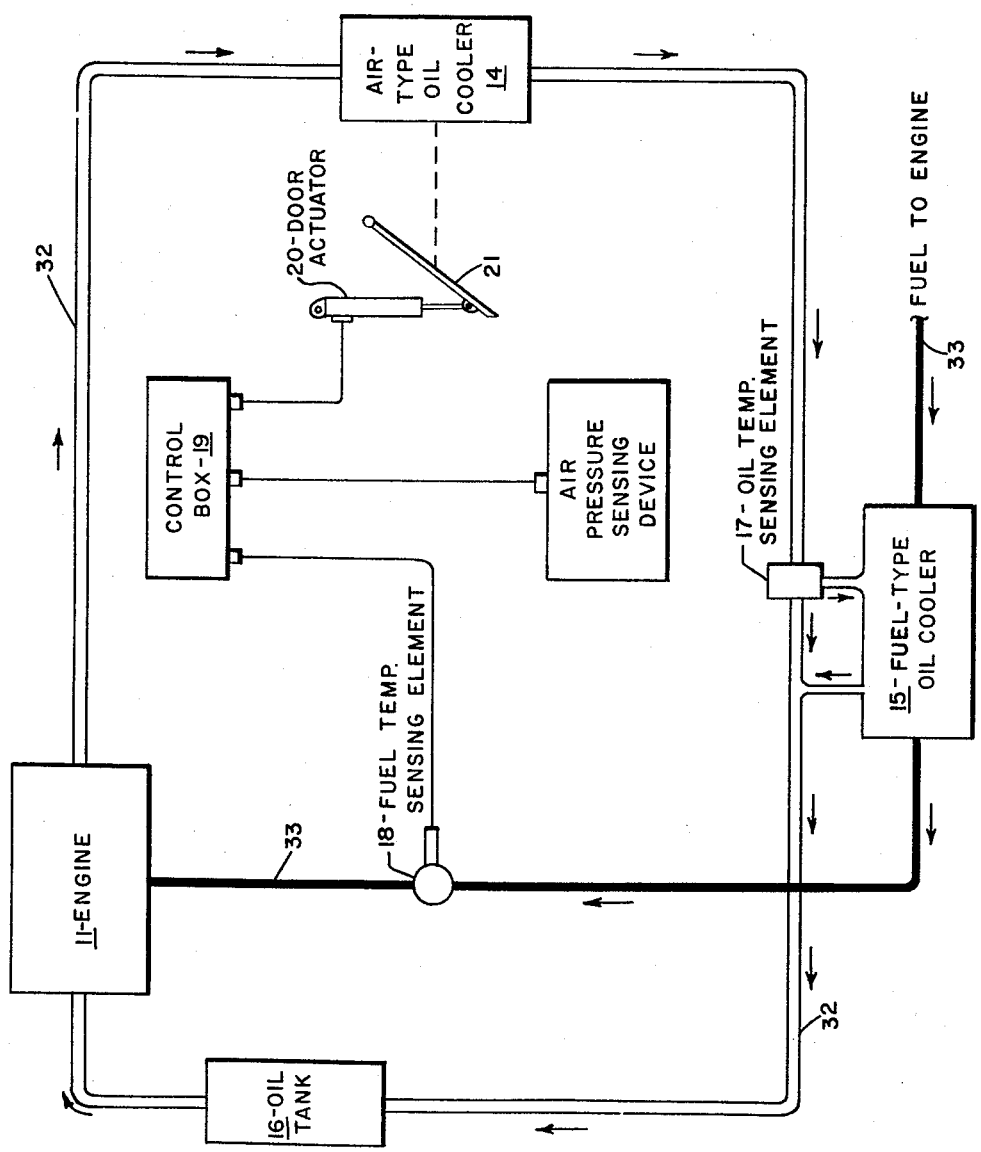
Fig. 5 is a schematic plan view of the oil cooling and drag reducting system.

This oil cooling and drag reducing system may be incorporated and utilized to great advantage in any air consuming supersonic vehicle, such as but not limited to, the aircraft 10, Figs. 1–3, powered by an engine 11 and capable of attaining supersonic speeds. The main air duct 12 for supplying air to the engine, a jet engine in the illustrated example located in the aft end of the duct, has a lip 13 forming a frontal air intake opening or air duct inlet. While only one air duct and one engine are illustrated, obviously a plurality of each may be utilized. The term "aircraft" may also include guided missiles, or the like.

The oil cooling and drag reducing system is shown schematically in Fig. 5 wherein the engine oil in line 32 of the force feed lubricating system including a suitable oil pump (not shown) passes through an air-oil heat exchanger or the air-type oil cooler 14 and a fuel-oil heat exchanger or the fuel-type oil cooler 15 before returning to the oil supply tank 16 and the engine 11. Examples of conventional air-oil and fuel-oil heat exchangers are disclosed in the above-identified patents.

Fuel-oil heat exchanger

Both the engine oil line 32 and the engine fuel line 33 pass through the fuel-oil cooler 15. Heat is transferred to all fuel from the oil that is directed through the heat exchanging units of the cooler by controlling action of a conventional oil temperature sensing element 17. When the engine is first started and the oil temperature is equal to or less than 225° F., for example, the oil is caused to by-pass the fuel-oil cooler. At oil temperatures between 225° F. and 250° F., for example, as during engine warmup, only a portion of the oil by-passes the fuel-oil cooler while the rest is cooled by the fuel flowing to the engine. Then when the oil reaches 250° F. or more, for example, all oil passes through the fuel-oil cooler in providing heat transfer from the oil to the fuel.

Air-oil heat exchanger

As the fuel temperature approaches the maximum desired level which may be the maximum safe heat absorption temperature of the fuel above which vaporization and/or cracking or breakdown of the fuel into harmful gums, carbons, and varnishes may occur, a conventional fuel temperature sensing element 18, positioned between the fuel-oil cooler and the engine goes into operation. The fuel temperature is maintained at this safe and desired level by the air type of oil cooler or air-oil heat exchanger 14 responsive to the fuel temperature. A control box 19 receives a fuel temperature indication from the fuel temperature sensing element 18 and operates motor 20 for actuating closure, gate, or valve 21 in a by-pass air duct 22 for metering cooling air to the air-oil cooler 14. Control box 19 is a switching device that may comprise hot and cold relays for operating the valve actuator 20, for example. It also includes a switch device for being overridden by the air pressure sensing switch 23 or 24 disclosed hereinafter. Accordingly, after the fuel is in the state of removing all the heat it has the capacity to remove in the fuel-oil heat exchanger, the remaining amount of heat required to be transferred from the oil is done so through the air-oil heat exchanger 14 positioned in the by-pass air duct 22, Figs. 1 and 4.

By-pass air duct

While the by-pass air duct means 22, Figs. 1 and 4, is illustrated as connected to the main air supply duct 12 with a single large opening in the main duct, other air removal means may be utilized, if desired, for drawing air from duct 12 such as by forming an annular slot or a ring of openings around the main air duct with an annular manifold over the slot or ring of holes to feed the air from the main duct to the by-pass air duct similar to the air removal means disclosed in assignee's copending application Ser. No. 590,490 filed June 11, 1956. The by-pass air duct 22 may be connected at any position desired to the main air supply duct 12. This by-pass air duct 22 provides two functions. It provides the additional cooling necessary for the oil cooling system when required whereby a smaller space-saving oil cooling system may be utilized, and it increases the net thrust of the aircraft by reduction of drag by reducing spillage drag on the aircraft air inlet by unloading, expelling, or dumping overboard the surplus air from the main air intake duct not required by the engine. The valve 21 in the by-pass air duct operated by actuator 20 for metering air through the by-pass duct is controlled by an air pressure sensing device identified as 23 in the embodiment of Fig. 1 and 24 in the embodiment of Fig. 2, both devices described in greater detail hereinafter.

Fig. 3 illustrates the advantageous effects of the by-pass air duct. The various amounts of frontal air consumed or eliminated by the disclosed system having the by-pass air duct are represented by cylinder A and annular cylinder B. The cylinder of frontal air in A represents the frontal or ram air consumed in either case from in front of the aircraft due to its consumption by the aircraft engine, a cross-section of cylinder A being congruent to the projection of the air duct inlet 13 on a plane normal to the air duct longitudinal axis. In the usual present day aircraft wherein all air that enters the air intake is consumed by the engine, only that ram air in cylinder A is therefore consumed, while all other frontal air, particularly that added by annular cylinder B spills over the air inlet 13, and causes a great amount of air turbulence C or slippage drag, resulting in the setting up of a high drag situation. In the disclosed oil cooling and drag reducing system utilizing the by-pass duct, the added air in annular cylinder B is also consumed due to that amount being taken in the main air supply duct 12 and dumped overboard further down the duct at a low drag exit, i. e., ejected at a small angle with no air separation, to reduce the slippage drag.

Fig. 4, a blown up detailed view of the by-pass duct 22, illustrates the air-oil cooler 14 mounted in the by-pass duct and valve 21 for controlling and metering air flow through the by-pass duct and accordingly through the cooler. Tight fitting closure or valve 21 pivoted at 25, Fig. 4, has two side baffles with only one baffle, 26b, being shown, a rear wall 27 having a slot 28 for the operating strut of the actuator 20, and an arcuate sealing baffle 29 for sealing the actuating compartment 30 from the by-pass air duct 22. A vent or orifice 31 is provided in the closure for equalizing the air pressure on the closure even though a high pressure may exist in the by-pass duct. Because the vent equalizes the pressures on both sides of the closure 21, the loads on the actuator are reduced considerably even with full air duct pressure upstream of the closure.

Pressure-sensing devices

In Fig. 1 the air pressure sensing mechanism 23 comprises a Mach meter 34 having a switch device 35, such as but not limited to a conventional diaphragm switch, for transmitting to the control box 19 the relative velocity of the outside air ramming the air duct inlet 13. While, under ordinary operating conditions, this control box 19 is responsive to the fuel temperature for controlling closure actuator 20 for metering the cooling air through the by-pass air duct and the air-oil cooler by operation of valve 21, the fuel temperature sensing means is overriden by the pressure sensing device 23 or Mach meter when the air speed reaches a particular value. This value or air speed, which is determined for each different aircraft or configuration of engine and supply air duct combination, is the speed at which the frontal or ram air begins to "pile up" in front of the air inlet due to the engine air consumption capacity, cylinder A in Fig. 3, having been surpassed and all of the ram air, as that added by annular cylinder B, Fig. 3, for example, is not removed. This condition causes excess and undesired spillage drag C as illustrated in Fig. 3. Further, this drag is alleviated by the disclosed oil cooling and drag reducing system by opening valve 21 to dump overboard the excess air added by annular cylinder B, via the by-pass air duct 22. An exemplary air speed is Mach number 1.1±.05. Accordingly, pressure sensing device 23 senses the Mach number at which the ram air begins to pile up and through control box 19 causes the valve 21 to meter by-pass cooling air from the main air duct 12.

In Fig. 2 the alternate air pressure sensing device 24 is provided at the air duct inlet 13 for sensing the position of the shock wave 36a or 36b. At any supersonic velocity when no excess air is being ejected from the air duct, the shock wave will be in a position forward of the air inlet 13, as at 36a for example, and its presence or pressure differential may be detected with, for example, conventional pressure sensing arms 37a to 37g of the shock wave or pressure sensing device 24, which device may, for example, be a series of bellows or diaphragms between each arm to indicate the position of the shock wave. Shock wave 36b is illustrated at air inlet 13. Accordingly, pressure sensing device 24 senses the absolute position of the shock wave and through control box 19 causes the gate valve 21 to meter by-pass cooling air from the main air duct 12. The above metering action in either modification accordingly results from the servo positioning of gate valve 21 by servo motor 20 as a function of the Mach number from either of the pressure sensing devices 23 or 24. As an increasing amount of air is ejected from the air duct via by-pass duct 22, the cylinder of air entering the air duct is enlarged, the shock wave moved rearward, and the amount of air spillage is decreased until the optimum condition is reached wherein the ejected air plus the air required for engine consumption fills the cylinder of air B, the cross section of which is congruent with the air duct inlet. In this optimum condition, the shock wave is at the air duct inlet and the air spillage over the inlet lips is zeroed. Accordingly, the valve 21 is varied in response to the pressure sensing means 24 to meter the by-pass air from the main air duct to always provide the optimum condition of zero spillage drag for any velocity in the supersonic range.

As shown above, an efficient oil cooling and drag reducing system is disclosed that increases the net thrust of the aircraft by reducing the frontal or spillage drag. This system or method of cooling the oil and reducing the spillage drag is one of reduced complexity, is readily adaptable to existing systems, and operates at all velocities to meter the by-pass cooling air in maintaining optimum condition of zero spillage drag.

It will be obvious to those skilled in the art that various changes may be made in the oil cooling and drag reducing system without departing from the spirit and scope thereof and therefore the invention is not limited by that which is shown in the drawings and described in the specification, but only as indicated in the appended claims.

I claim:

1. In combination with a vehicle having an air consuming engine, fuel and oil supply lines, and an engine air supply duct in said vehicle for receiving ram air through the inlet thereof having by-pass air duct means for unloading said air supply duct, an oil cooling and drag reducing system comprising, a fuel-oil heat exchanger connected in the fuel and oil lines for transferring heat from the oil to the fuel, fuel temperature sensing means in the fuel line responsive to the heat transferred to the fuel, said by-pass air duct means having air-oil heat exchanger means for transferring heat from the oil to the air, and said by-pass air duct means having valve means for metering air through said air-oil heat exchanger means, said valve means being responsive to said fuel temperature sensing means for reducing the aerodynamic drag caused by the ram air spillage over the inlet of the air supply duct to provide an efficient oil cooling and drag reducing system.

2. In combination with a vehicle having an air consuming engine, fuel and oil supply lines connected to said engine, and an engine air supply duct in said vehicle for receiving ram air through the inlet thereof having by-pass air duct means for unloading said air supply duct, an oil cooling and drag reducing system comprising, a fuel-oil heat exchanger connected in the fuel and oil lines for transferring heat from the oil to the fuel, fuel temperature sensing means in the fuel line responsive to the heat transferred to the fuel, said by-pass air duct means having air-oil heat exchanger means for transferring heat from the oil to the air, said by-pass air duct means having valve means for metering air through said air-oil heat exchanger means, and air pressure sensing means, said valve means being responsive to said pressure sensing means for reducing the aerodynamic drag caused by the ram air on the air supply duct inlet to provide an efficient oil cooling and drag reducing system.

3. In combination with a vehicle having an air consuming engine, fuel and oil supply lines connected to said engine, and an engine air supply duct in said vehicle for receiving ram air through the inlet thereof having by-pass air duct means for unloading said air supply duct, an oil cooling and drag reducing system comprising, a fuel-oil heat exchanger connected in the fuel and oil lines for transferring heat from the oil to the fuel, fuel temperature sensing means in the fuel line responsive to the heat transferred to the fuel, said by-pass air duct means having air-oil heat exchanger means for transferring heat from the oil to the air, said by-pass air duct means having valve means for metering air through said air-oil heat exchanger means, and pressure sensing means, said pressure sensing means being a Mach meter means, said valve means being responsive to said Mach meter means for reducing the aerodynamic drag caused by the ram air on the air supply duct inlet to provide an efficient oil cooling and drag reducing system.

4. In combination with a vehicle having an air consuming engine, fuel and oil supply lines connected to said engine, and an engine air supply duct in said vehicle for receiving ram air through the inlet thereof having by-pass air duct means for unloading the air supply duct, an oil cooling and drag reducing system comprising, a fuel-oil heat exchanger connected in the fuel and oil lines for transferring heat from the oil to the fuel, fuel temperature sensing means in the fuel line responsive to the heat transferred to the fuel, said by-pass air duct means having air-oil heat exchanger means for transferring heat from the oil to the air, said by-pass air duct means having valve means for metering air through said air-oil heat exchanger means, and pressure sensing means, said pressure sensing means being a shock wave sensing means adjacent said air supply duct, said valve means being responsive to said shock wave sensing means for reducing the aerodynamic drag caused by the ram air on the air supply duct inlet to provide an efficient oil cooling and drag reducing system.

5. In combination with a vehicle having an air consuming engine, fuel and oil supply lines connected to said engine, and an engine air supply duct in said vehicle for receiving ram air through the inlet thereof having by-pass air duct means for unloading the air supply duct, an oil cooling and drag reducing system comprising, a fuel-oil heat exchanger connected in the fuel and oil lines for transferring heat from the oil to the fuel, fuel temperature sensing means in the fuel line responsive to the heat transferred to the fuel, said by-pass air duct means having air-oil heat exchanger means for transferring heat from the oil to the air, said by-pass air duct means having valve means for metering air through said air-oil heat exchanger means, said valve means being responsive to said fuel temperature sensing means, and air pressure sensing means, said air pressure sensing means being means for overriding said fuel temperature sensing means for opening said valve means for reducing the aerodynamic drag caused by the ram air on the air supply duct inlet to provide an efficient oil cooling and drag reducing system.

6. In combination with a vehicle having an air consuming engine, and an engine air supply duct means in said vehicle for receiving ram air in the frontal opening thereof, an oil cooling and drag reducing system comprising by-pass air duct means in said vehicle for expelling the ram air not consumable by the engine, fuel-oil heat exchanger means for transferring heat from the engine oil to the engine fuel, a fuel temperature sensing means responsive to the heat transferred to the fuel, said by-pass air duct means having air-oil heat exchanger means for transferring heat from the oil to the air, and said by-pass air duct means having valve means, said valve means being responsive to said fuel temperature sensing means for reducing the aerodynamic drag caused by the ram air on the frontal opening of said air supply duct means to provide an efficient oil cooling and drag reducing system.

7. In combination with a vehicle having an air consuming engine, and an engine air supply duct means in said vehicle for receiving ram air in the frontal opening thereof, an oil cooling and drag reducing system comprising by-pass air duct means in said vehicle for expelling the ram air not consumable by the engine, fuel-oil heat exchanger means for transferring heat from the engine oil to the engine fuel, fuel temperature sensing means responsive to the heat transferred to the fuel, said by-pass air duct means having air-oil heat exchanger means for transferring heat from the oil to the air, said by-pass air duct means having valve means, and air pressure sensing means, said valve means being responsive to said air pressure sensing means for reducing the aerodynamic drag caused by the ram air on the frontal opening of said air supply duct means to provide an efficient oil cooling and drag reducing system.

8. In combination with a vehicle having an air consuming engine, and an engine air supply duct means in said vehicle for receiving ram air in the frontal opening thereof, an oil cooling and drag reducing system comprising by-pass air duct means in said vehicle for expelling the ram air not consumable by the engine, fuel-oil heat exchanger means for transferring heat from the engine oil to the engine fuel, fuel temperature sensing means responsive to the heat transferred to the fuel, said by-pass air duct means having air-oil heat exchanger means for transferring heat from the oil to the air, said by-pass air duct means having valve means, and pressure sensing means, said pressure sensing means being a Mach meter, said valve means being responsive to said Mach meter for reducing the aerodynamic drag caused by the ram air on the frontal opening of said air supply duct means to provide an efficient oil cooling and drag reducing system.

9. In combination with a vehicle having an air consuming engine, and engine air supply duct means in said vehicle for receiving ram air in the frontal opening thereof, an oil cooling and drag reducing system comprising by-pass air duct means in said vehicle for expelling the ram air not consumable by the engine, fuel-oil heat exchanger means for transferring heat from the engine oil to the engine fuel, fuel temperature sensing means responsive to the heat transferred to the fuel, said by-pass air duct means having air-oil heat exchanger means for transferring heat from the oil to the air, said by-pass air duct means having valve means, and pressure sensing means, said pressure sensing means being a shock wave sensing means adjacent said air supply duct, said valve means being responsive to said shock wave sensing means for opening said valve means for reducing the aerodynamic drag caused by the ram air on the frontal opening of said air supply duct means to provide an efficient oil cooling and drag reducing system.

10. In combination with a vehicle having an air consuming engine, and engine air supply duct means in said vehicle for receiving ram air in the frontal opening thereof, an oil cooling and drag reducing system comprising by-pass air duct means in said vehicle for expelling the ram air not consumable by the engine, fuel-oil heat exchanger means for transferring heat from the engine oil to the engine fuel, fuel temperature sensing means responsive to the heat transferred to the fuel, said by-pass air duct means having air-oil heat exchanger means for transferring heat from the oil to the air, said by-pass air duct means having valve means, said valve means being responsive to said fuel temperature sensing means, and air pressure sensing means for overriding said fuel temperature sensing means for opening said valve means for reducing the aerodynamic drag caused by the ram air on the frontal opening of said air supply duct means to provide an efficient oil cooling and drag reducing system.

11. In combination with a vehicle having an air consuming engine having fuel and oil supply lines connected to said engine, an oil cooling system comprising, a fuel-oil heat exchanger connected in the fuel and oil lines for transferring heat from the oil to the fuel, fuel temperature sensing means in the fuel line responsive to the heat transferred to the fuel, air-oil heat exchanger means for transferring heat from the oil to the air, and valve means for metering air through said air-oil heat exchanger means, said valve means being responsive to said fuel temperature sensing means for controlling the temperature of the oil to provide an efficient oil cooling system.

12. In combination with a vehicle having an air consuming engine, a drag reducing system comprising, an engine air supply duct in said aircraft having an inlet for receiving ram air therethrough, air pressure sensing means in said aircraft, by-pass air duct means for unloading said engine air supply duct, and said by-pass air duct means having valve means, said valve means being responsive to said pressure sensing means for reducing the aerodynamic drag caused by the ram air on said air supply duct inlet to provide an efficient drag reducing system.

13. In the combination recited in claim 12, said pressure sensing means in said aircraft comprising a Mach meter means.

14. In the combination recited in claim 12, said pressure sensing means in said aircraft comprising a shock wave sensing means.

References Cited in the file of this patent

UNITED STATES PATENTS

| | | |
|---|---|---|
| 2,410,856 | Koppen | Nov. 12, 1946 |
| 2,434,085 | Suggs | Jan. 6, 1948 |
| 2,631,796 | Williamson et al. | Mar. 17, 1953 |
| 2,731,239 | Andersen | Jan. 17, 1956 |
| 2,752,111 | Schairer | June 26, 1956 |